Dec. 25, 1951     P. PANHARD     2,579,608
VALVE RETURN DEVICE
Filed July 20, 1945
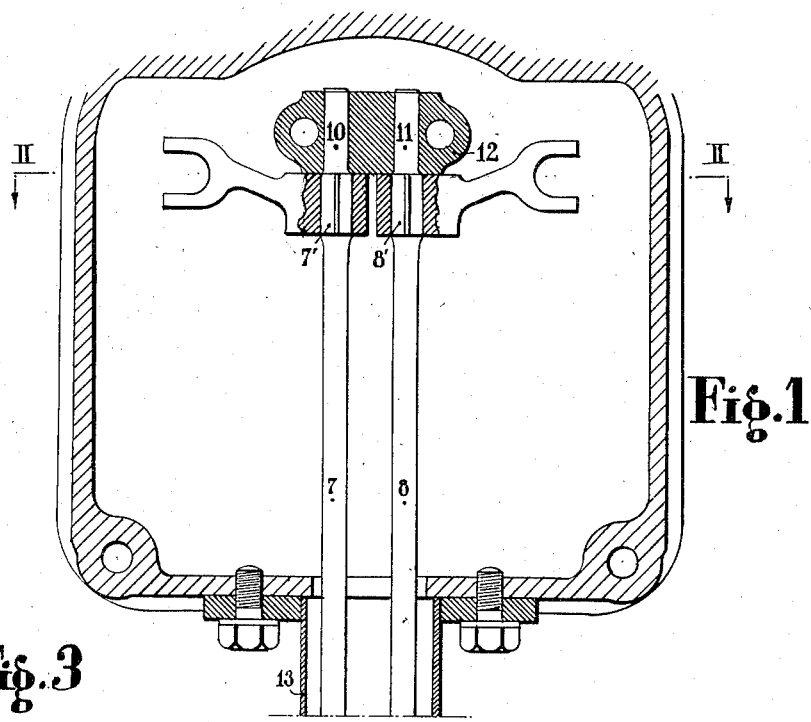
Fig.1
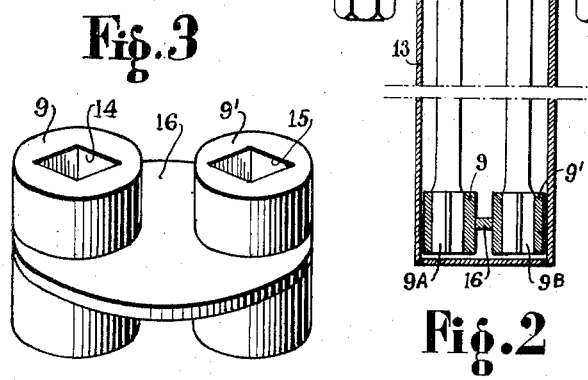
Fig.3    Fig.2
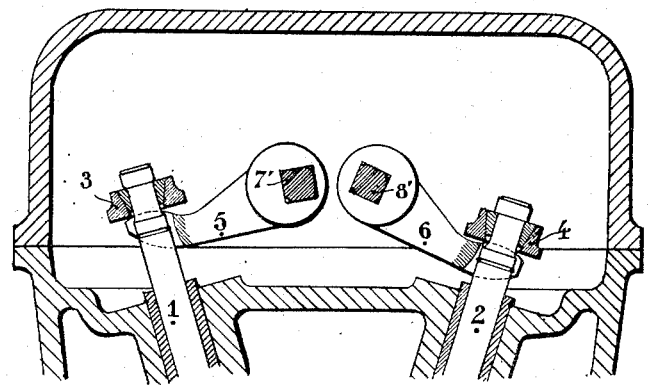
Inventor
P. Panhard Patented Dec. 25, 1951

2,579,608

UNITED STATES PATENT OFFICE 2,579,608

VALVE RETURN DEVICE

Paul Panhard, Paris, France, assignor to Société Anonyme des Anciens Etablissements Panhard & Levassor, Paris, France Application July 20, 1945, Serial No. 606,079½
In France January 10, 1944

Section 1, Public Law 690, August 8, 1946
Patent expires January 10, 1964

1 Claim. (Cl. 277—60)

The many difficulties encountered when a valve engine is to be caused to rotate at high speed are known. One of said difficulties arises, when use is made of coil springs for turning back the valves, from the peculiar inertia of said springs and of the movable cups which serve to connect them to the valve.

The weight of the cup counts in totality since it is entirely movable, and the weight of the spring for half since one of its ends is fixed; now, together said weights lead to considerable spring forces, if it is desired that the movement of the valve should exactly follow that of its control cam.

The use of tongs or hair-pin springs has already been proposed, which procure a great improvement in that they considerably reduce the weight of the parts in motion. The use of torsion bars has also been suggested, but, up to now, they have not been used practically owing to the excessive length of the bar which rendered them nearly impossible to house.

The present invention has for object an improved arrangement of said bars which allows of considerably reducing their overall dimensions and of housing them without difficulty.

In accordance with the present invention, a pair of parallel torsion bars are mounted at one end thereof in a fixed bearing, means are provided to operatively connect the bars adjacent their fixed ends to a pair of valves, the arrangement being such that the reciprocation of the valves will effect oscillation of the corresponding ends of the torsion bars while the opposite ends of the bars are interconnected by means of a flexible disc whereby the oscillations of one of the torsion bars will be transmitted to the other bar through the flexible disc and at the same time permit the torsion bars to twist slightly relative to each other through the flexure of the disc.

The accompanying drawing shows by way of example an embodiment of the present invention.

Fig. 1 is a plan view of such a torsion bar.

Fig. 2 is a view in cross section according to line II—II of Fig. 1.

Figure 3 is a view in perspective of the flexible disc interconnecting the ends of the torsion bars remote from the fixed bearing.

As shown in Figure 2, rods 1 and 2 of the inlet and exhaust valves are engaged by forked levers 5 and 6 which in turn bear against cups 3 and 4 carried by the rods adjacent the ends thereof. The opposite ends of the levers are provided with square bores which engage squared sections 7' and 8' of a pair of parallel torsion bars 7 and 8 respectively. Manifestly, any suitable type of connection between the levers and bars may be employed so long movement of the levers will be imparted to the torsion bars.

The ends of the bars adjacent the squared sections 7' and 8' are supported in a fixed bearing 12 as indicated at 10 and 11 whereas the opposite ends are squared as at 9A and 9B for insertion in squared bores 14 and 15 provided in spaced sleeves 9 and 9'. The sleeves 9 and 9' are carried by a thin flexible disc 16 as is clearly depicted in Figure 3. It will be appreciated that the oscillations of one of the torsion bars will be transmitted to the other bar through the disc 16 while permitting the bars to twist slightly relative to each other by virtue of the flexure of the disc.

If the control is to be completely enclosed, the two bars can be housed in a tube of small diameter 13, in the end of which the assembling sleeve 9 is centered; said sleeve can only rotate about the center of symmetry of the unit comprising the two bars.

Finally, instead of connecting the two valves of one and the same cylinder, which is the usual case, two adjacent valves belonging to different cylinders can be perfectly connected by means of such a control, provided that one of the valves serves as anchoring means for restoring the other.

In order to render the drawing clearer, neither the rockers, nor the push-pieces have been illustrated, since they can be of any type whatever, although it is advantageous to choose them as light as possible.

What I claim as my invention and desire to secure by Letters Patent is:

In an assemblage of the character described, a pair of parallel torsion bars each mounted for oscillation at an adjacent pair of ends in a fixed bearing, a pair of poppet valves, means interconnecting said poppet valves respectively with said pair of ends so that the reciprocations of said valves will cause oscillations of the corresponding ends of the bars, the other pair of adjacent ends of said bars being interconnected by a thin flexible disc in such a manner that the oscillations of one of the bars will be transmitted to the other bar through the disc while permitting the bars to twist slightly relative to each other through the flexure of said disc.

PAUL PANHARD.

REFERENCES CITED

The following references are of record in the file of this patent:

UNITED STATES PATENTS

| Number | Name | Date |
|---|---|---|
| 2,241,826 | Rabe | May 13, 1941 |

FOREIGN PATENTS

| Number | Country | Date |
|---|---|---|
| 47,911 | France | May 11, 1937 |
| 844,796 | France | May 1, 1939 |